United States Patent Office 2,841,049
Patented July 1, 1958

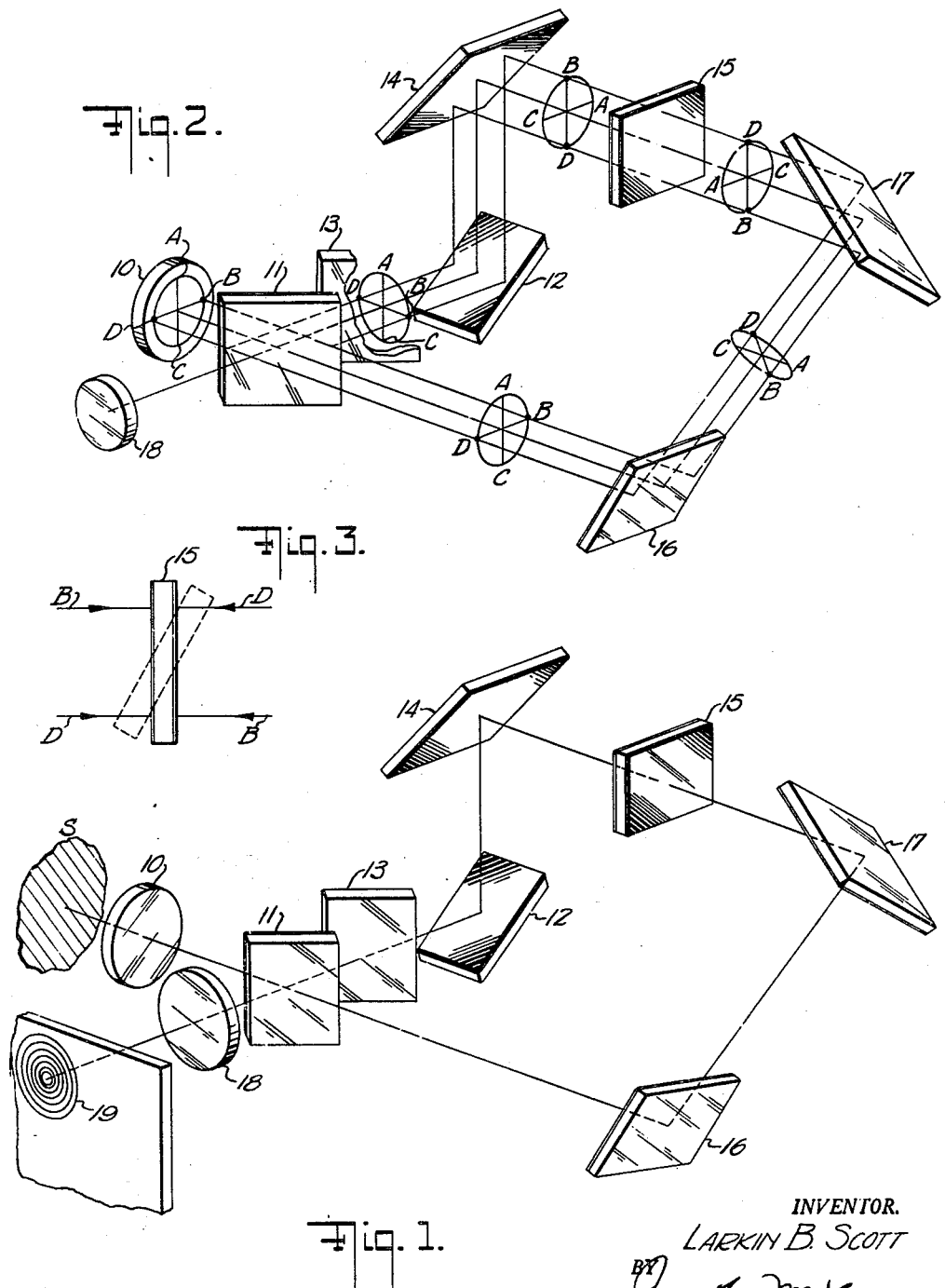

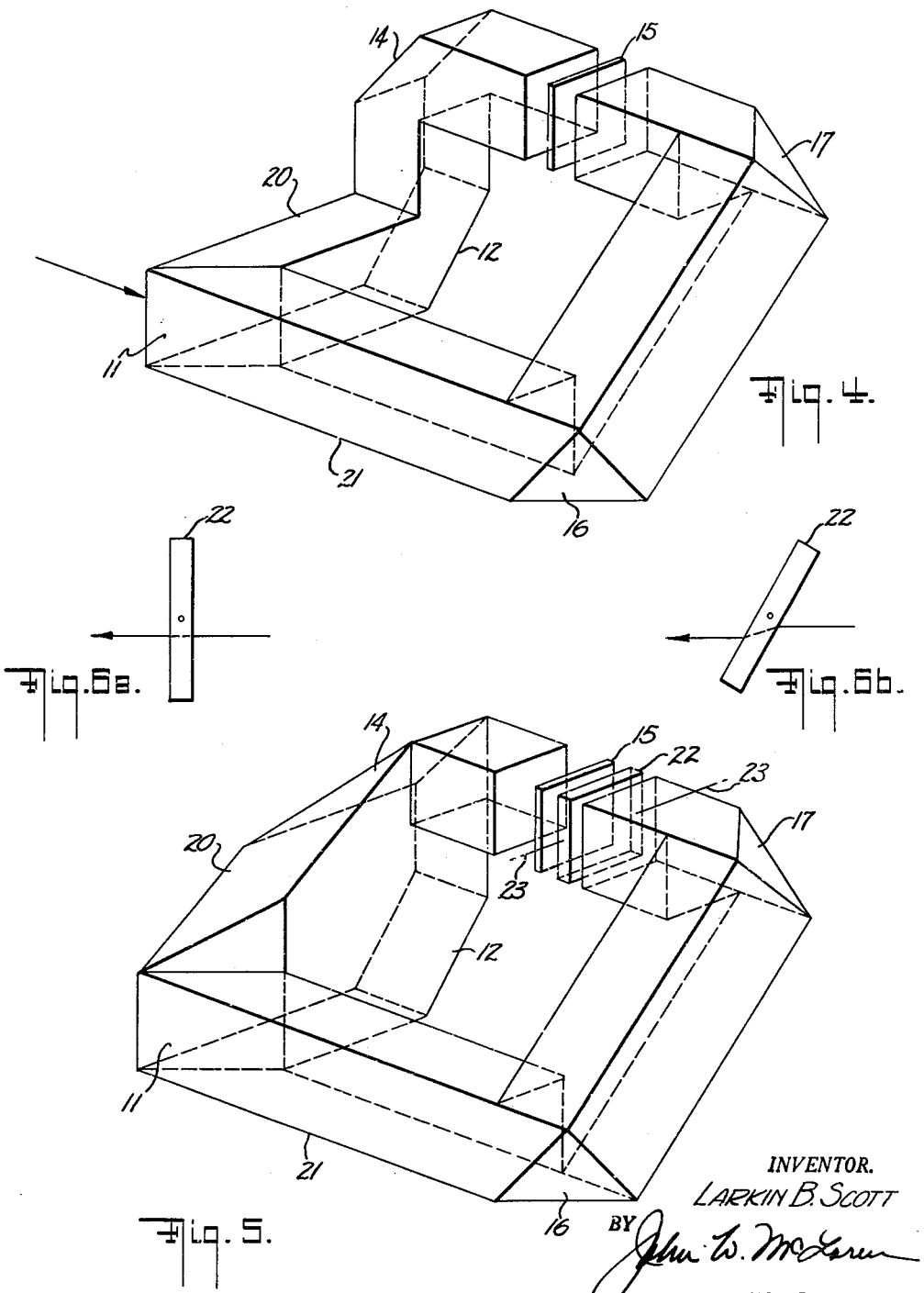

2,841,049

INTERFEROMETER

Larkin B. Scott, Fort Worth, Tex., assignor to The Perkin-Elmer Corporation, Norwalk, Conn., a corporation of New York Application March 30, 1955, Serial No. 497,830

6 Claims. (Cl. 88—14)

This invention pertains to an interferometer and, in particular, is directed to a novel interferometer which is not subject to the usual difficulties of maintaining precise parallelism of the imaged reflective surfaces which produce interfering wavefronts.

Of the various types of known interferometers, probably the greatest number are variant forms of the basic Michelson interferometer principle. In an interferometer of the Michelson type, there are two separated reflective surfaces, one of which is associated with each of the two wavefronts which produce characteristic light interference phenomenon. At least one of these reflective surfaces is usually adjustable but, in making such adjustment, extreme care must be taken to insure that the same angular relationship as existed between the images before adjustment also obtains after adjustment. Assuming, for purposes of explanation, that such angular relationship between images produced in the interferometer is one of parallelism, a loss of accuracy will result if the two reflective surfaces are not imaged perfectly parallel to each other when their separation is varied in order to make measurements or carry out investigation of wavefronts. This presents an extremely troublesome problem in that the tilt of the two reflective surfaces out of perfect parallelism with each other must be kept to the order of less than one-tenth second of arc, which requirement places extraordinary demands on the mechanical supports for such reflective surfaces and their related operative positioning means. It may be readily appreciated that this type of apparatus, therefore, requires a degree of mechanical precision which is most difficult and sometimes impossible to attain by ordinary means.

One variation of the basic Michelson interferometer which was designed to avoid this problem employs in place of each fully reflective plane surface of the Michelson interferometer an assembly comprising corner reflective surfaces intersecting at an angle of approximately 90 degrees. However, an interferometer of the corner mirror type, improved as it is in some respects, has several shortcomings. The movable reflective optical assembly must usually be comprised of several elements oriented in a particular angular disposition with respect to each other, which relationship must be precisely preserved regardless of the positional adjustment of the assembly. Moreover, the corner reflective surfaces require a larger size beam-splitter and a larger size compensating element to equalize the optical paths, which makes it extremely difficult to reduce the size of this type of interferometer beyond certain practical limits. As a result, the over-all size of this particular type of interferometer must be relatively larger than other types of interferometers and this increased size is not generally desirable.

The present invention comprises an interferometer which employs an optical element having two reflective surfaces fixed in rigid back-to-back relation to each other. Entrant light is split by the interferometer into two beams or wavefronts, one of which is directed to one of these two reflective surfaces and the other to the opposite of the two reflective surfaces along a common axis but in opposite directions so that both beams are reflected to retrace their respective initial paths in return directions. The two beams thus returned are optically super-imposed for viewing purposes, producing fringe patterns indicative of the relative character of the beams. The manner in which the two beams are directed to the reflective surfaces is most important, however, because in accordance with the concept of the present invention they must be in exactly opposite orientation with respect to their common axis in order to produce fringe patterns which are independent of the tilt of the optical element comprising the back-to-back reflective surfaces.

A better understanding of the invention may be had by reference to the drawings in which:

Fig. 1 is an isometric schematic representation of the optical paths traversed in a typical embodiment of the invention.

Fig. 2 is an isometric schematic representation of an embodiment of the present invention and the fringe patterns which may be generated by an extended source of light as viewed through the interferometer.

Fig. 3 is a schematic representation of the result of tilting the dual reflective element of the present invention.

Fig. 4 is yet another embodiment of the present invention comprising a prism assembly and a dually reflective element.

Fig. 5 is yet another embodiment of the present invention comprising a prism assembly, a dually reflective element and a compensating element.

Figs. 6a and 6b illustrate the operation of means providing a variation of the optical path length of the beam which traverses the compensating element of Fig. 5.

Referring to Fig. 1, it may be seen that light entering the interferometer passes through a lens 10 and falls upon a semi-reflective surface 11. The semi-reflective surface 11 reflects one half of the entrant light to a mirror 12 while allowing approximately one half of the light to pass on in its original direction. The light entering the interferometer is thus split into two substantially equal beams which, for convenience, may be designated as the first and second beams. A compensating element 13 may be placed in the optical path of the first beam between the semi-reflective surface 11 and the mirror 12 so as to compensate for the glass in the beam-splitter and equalize the light path of the two beams for all wavelengths. This is necessary because the beam which passes directly through the semi-reflective surface traverses a thickness of glass which the reflected beam does not. Thus, an equal thickness of like glass disposed appropriately between the semi-reflective surface 11 and mirror 12 in the path of the first beam equalizes the optical paths of the two beams to that point. The beams passing through the glass of the optical elements undergo relatively small deviations due to refraction, but this is not illustrated in order to simplify the drawings.

The mirror 12, it will be noted, directs the first beam through a right angle deflection in a direction which is normal to the direction of the second beam. The first beam is then directed through a further right angle deflection by a mirror 14 in a direction parallel to the original direction of the second beam, whence it strikes one of the two back-to-back reflective surfaces of the optical element 15.

The second beam, after passing through the semi-reflective beam-splitter 11 is directed by a mirror 16 through a right-angle deflection in a plane which includes the twice-deflected first beam. The second beam strikes a mirror 17 and is directed by a further right angle deflection along a path having an axis coinciding with that of the twice-deflected first beam but in a direction opposite thereto. The two beams thus strike the same optical element 15 on opposite sides and are each reflected along their respective paths in return directions so that they may be viewed through lens 18, for instance, and the characteristic fringe patterns generated may be observed at 19.

As has been previously mentioned, the orientation of the beams when they reach the back-to-back reflective surfaces of the same optical element is most important, and it may be seen that, in order to make the fringe patterns independent of the tilt of the dual reflective optical element 15, the two beams must be in exactly opposite orientation with respect to each other. The desired orientation of the beams may be achieved by rotating each beam 90 degrees about its central axis, but in opposite directions. The beams are illustrated as being directed to element 15 in opposite directions but along a common axis. Thus, the opposite rotation of the beams results in their being angularly disposed 180 degrees from each other with respect to their central axes so that like points of original beams are diametrically opposed at element 15. When the two beams reach element 15, their central axes are preferably in substantial alignment as shown, though they need not be absolutely in alignment for the invention to operate satisfactorily.

Referring now to Fig. 2, it may be seen how orientation is accomplished in accordance with the concept and teachings of the present invention. Assuming that a beam has arbitrarily designated points, such as A, B, C and D, about the extremes of its periphery, that portion of the entrant light which is reflected by the semi-reflective surface 11 herein designated as the first beam, undergoes a change in orientation due to that initial reflection in that its disposition about a vertical axis is reversed. That part of the entrant light which passes through the semi-reflective surface 11 and has been designated as the second beam is seen to have an unchanged orientation. The first beam, upon striking the reflective surface of mirror 12, is directed to mirror 14 where it is reversed about its horizontal axis. From mirror 14 the first beam is directed to one of the dual reflective surfaces of optical element 15 and the extremities of the beam are oriented as illustrated in Fig. 2.

The second beam, after passing through the semi-reflective surface of element 11, undergoes multiple reflections which rotate it about its major axis by 90 degrees in a fashion somewhat similar to that of the first beam, but in an opposite direction. Thus, each of the two beams derived from the initial entrant light having been rotated 90 degrees in opposite directions, and directed along paths to a common axis but in opposed directions, produces relative orientation about that axis in an exactly opposite sense when they strike the back-to-back reflective surfaces of optical element 15.

From the illustration of Fig. 3, it may be seen that if the optical element 15 is tilted about its horizontal axis, for instance, as shown by the broken line representation, the paths of the beams at points B on either side of the optical element 15 will be lengthened or shortened by an equal amount on both sides of the optical element 15 as also will the paths at points D. Similarly, as may be understood from Fig. 2, if the optical element 15 is tilted about its vertical axis, its paths at the points A will be lengthened or shortened by an equal amount and the same, of course, is true of the paths of the beams at points C on either side of the optical element 15. While tilting of the optical element 15 may cause the observed fringes to shift in apparent direction by an amount related to the tilt angle, the apparent shift does not destroy the production of the fringes which is dependent upon substantial parallelism of the reflective surfaces of optical element 15. Therefore, the production of the fringes themselves is independent of the tilt of optical element 15.

This is most important in interferometer work because the reflective surfaces which return the interfering beams to a common point so that the fringe patterns may be viewed, must be adjustable to make the interferometer a useful instrument. Such adjustment by actual physical displacement will very likely disturb the precise orientation of the reflective surfaces of optical element 15 from the most desirable position, which is usually normal to the beams impinging thereon. However, because an interferometer constructed in accordance with the present invention is not subject to loss of fringes due to tilt of the adjustable reflective surface, its precise orientation after such adjustment is of no great consequence. This is a most desirable feature of the present invention for, in effect, it greatly relieves the demand for mechanical precision of the device without sacrificing the accuracy of the instrument.

In the present invention as embodied in the illustration of Fig. 1, for instance, it is not absolutely necessary that the two reflective surfaces of element 15 be perfectly parallel, since it is possible to adjust the angular incidence of the rays impinging thereon to be normal to both surfaces. For the most convenient instrumentation, however, it may be desirable to construct the two reflective surfaces of element 15 reasonably close to parallelism.

Another most important feature of the present invention may be understood by observing that when the optical element 15 is moved, the path length of one beam is lengthened and the path length of the other beam is shortened by an equal amount. Since, in an interferometer, the beams initially traverse a path which they later retrace by reflection, movement of the reflective surfaces of optical element 15 will shorten one optical path and lengthen the other optical path by twice the amount of such movement. However, in the present invention, it may be readily seen that movement of the back-to-back dually reflective element 15 will change the observed fringe patterns by four times the amount of such movement rather than twice the amount of such movement as is ordinarily the case in conventional interferometers. Thus, the interferometer of the present invention is rendered twice as sensitve in its measurement of displacement of the back-to-back dually reflective element 15. This is, of course, in many applications a most desirable feature as, for instance, when the interferometer is used to measure displacement in terms of wave-lengths of light.

Fig. 4 is an isometric view of an embodiment of the present invention which comprises a prism assembly including two prisms 20 and 21, one of which has a semi-reflective coating at surface 11. The two prisms are joined by being appropriately cemented at the two faces having 45 degree angles so as to make the semi-reflective surface 11 an internal surface of the prism assembly. The semi-reflective surface 11 thus splits the entrant light passed in the direction of the arrow into two beams in a manner similar to that described in the explanation of the optical paths of the beams through the analogous parts of the embodiments of Figs. 4 and 5 have the same numerical designation as in Figs. 1 and 2. The two beams traverse paths which are generally comparable to the paths of the two beams in Figs. 1 and 2 except that the beams are internally reflected by polished surfaces of the prisms disposed as shown. These polished surfaces which reflect internally are shown as being disposed in substantially the same angular interrelationship as the mirrors of Figs. 1 and 2. It should be apparent, however, that any arrangement which will direct the two beams to a common axis and in opposite orientation about that axis will accomplish the same result in accordance with the teachings of the present invention.

An important feature of a prism assembly of the type illustrated in Fig. 4 is that the reflective surfaces such as 11, 12, 14, 16 and 17 are absolutely fixed in relation to each other, thereby eliminating the possibility of even slight changes in angular disposition therebetween. This is so, as may be readily observed because of the fact that the reflective surfaces are actually part of a unitary structure in the form of the prism assembly comprising prisms 20 and 21. A further advantage of this embodiment of the invention is that it may be executed as a comparatively very small instrument in that a minimum of supports and mounts are required as compared to the multiple mountings for a number of different mirrors in a common frame or base structure which are required for the embodiment of Fig. 1, for instance. This latter-named advantage is in addition to those basic inherent features of the present invention by which it is rendered capable of producing fringe patterns characteristic of the wave-front of light impinging thereon independently of the tilt of the reflective surfaces which return the two versions of the entrant light to a point where they may be viewed superimposed one upon the other.

As is apparent from Fig. 4, the respective optical paths of the two beams through the glass of prisms 20 and 21 may be of different lengths. If the optical paths through the glass are very nearly but not exactly equal and a source of monochromatic light is used in conjunction with the interferometer, the total optical paths through the respective prisms 20 and 21, and through the respective air spaces of the prism assembly, may be equalized by adjusting the position of the dually reflective element 15. By positioning the dually reflective element 15 in the gap of the prism assembly, the air space which one beam traverses can be lengthened while the air space which the other beam traverses is shortened. Such difference in the air space which the monochromatic beams traverse may therefore be used to exactly equalize the total optical paths which the beams traverse including any relatively small difference in the respective paths through the glass of the prisms.

However, such adjustment of the air space paths to compensate for slight differences in the paths of the beams through glass is not generally applicable to an embodiment of the present invention such as shown in Fig. 4 when white light is used, for instance. Any air space offers an optical path, the apparent length of which varies as a function of the different wavelengths which compositely constitute white light. The adjustment of the length of the optical path of white light through air space, therefore, changes the optical path length differently for each component of the white light and does not produce the same interference fringe patterns as monochromatic light under comparable optical conditions. Compensation to equalize the optical path lengths of white light must, therefore, be accomplished by other means.

In Fig. 5 there is illustrated yet another embodiment of the present invention which includes a prism assembly much like that of Fig. 4, but additionally has a compensating element 22 positioned in the shorter optical path of the two beams between one of the prisms 21 of the prism assembly and the dually reflective element 15. This compensating element 22 is pivotably mounted about an axis as illustrated in Fig. 6. By angularly adjusting the compensating element 22 about its pivotal axis 23 the effective amount of glass interposed in the path of one of the beams may be selectably altered to equalize the total optical path lengths of the two beams of white light (or any equivalent light comprised of different wavelengths). Pivotal adjustment of the compensating element 22 changes the angle of incidence of the light, from which it follows that its angle of refraction through the compensating element 22 is also changed whereby the amount of glass traversed by the beam passing through the compensating element 22 may be selectively varied. This effect is shown in Figs. 6a and 6b. In Fig. 6a, the path length of the light passing through the compensating element 22 is shortest because there is no refraction. When the compensating element 22 is pivotally disposed about its axis, the path of the principal ray of the beam passing therethrough is angularly displaced from its original path as shown in Fig. 6a. As may readily be seen from these illustrations, the beam passing through the compensating element 22 may be caused to traverse an optical path of adjustable length, yet emerge from the compensating element in the same angular disposition at which it entered the compensating element 22. This, of course, insures that the beam which has a compensated optical path will strike the dually reflective element of the present invention at the same angle regardless of adjustment of its optical path length for equalization purposes.

Since many changes could be made in the specific combinations of apparatus disclosed herein and many apparently different shapes and configurations of apparatus embodying the teachings of this invention could be made without departing from the scope thereof, it is intended that all matter contained in the foregoing description or shown in the accompanying drawings shall be interpreted as being illustrative and not in a limiting sense.

I claim:

1. In an interferometer, means for splitting entrant light into first and second beams, an optical element comprising two reflective surfaces rigidly fixed in back-to-back relation to each other, means for directing said beams to opposite reflective surfaces of said optical element, said means being positioned and arranged to direct said beams along separate paths effecting opposite 90-degree rotation of each beam, whereby fringe patterns are produced independently of the tilt of said optical means.

2. In an interferometer, means for splitting entrant light into first and second beams disposed at right angles, means for directing said first beam through a right angle deflection normal to the direction of said second beam, means for directing said first beam through a further right angle deflection and parallel to the direction of said second beam, means for directing said second beam along an axis substantially in alignment with the axis of said twice-deflected first beam but in a direction opposite thereto, and an optical element having back-to-back reflective surfaces positioned in the path of said coincident beams for reflecting both beams along their initial paths in return directions, whereby fringe patterns are produced independently of the tilt of said optical element.

3. In an interferometer, means for splitting entrant light into first and second beams disposed at right angles, means for directing said first beam through a right angle deflection in a plane normal to the direction of said second beam, means for directing said first beam through a further right angle deflection and parallel to the direction of said second beam, means for directing said second beam through a right angle deflection so that its optical axis lies in a plane defined by the optical axes of said twice-deflected first beam and said undeflected second beam, means for deflecting said second beam along an axis substantially in alignment with that of said first beam but in a direction opposite thereto, an optical element having back-to-back reflective surfaces, said optical element being positioned with its optical axis substantially in alignment with the axes of said beams for reflecting both said beams along their respective paths in return directions, whereby fringe patterns are produced independently of the tilt of said optical element.

4. In an interferometer, a semi-reflective surface positioned at a 45-degree angle to entrant light for forming first and second beams at right angles, means for directing said first beam through a right angle deflection in a plane normal to the direction of said second beam, means for directing said first beam through a further right angle deflection and parallel to the initial direction of said second beam, means for directing said second beam through a right angle deflection so that its optical axis lies in a plane defined by the optical axes of said twice-deflected first beam and said undeflected second beam, means for deflecting said second beam along a path having an axis substantially coinciding with that of said twice-deflected first beam but in a direction opposite thereto, an optical element having back-to-back reflective surfaces, said optical element being positioned with its optical axis substantially in alignment with the axes of said beams for reflecting both said beams along their respective paths in return directions, whereby fringe patterns are produced independently of the tilt of said optical element.

5. In an interferometer, means for splitting entrant light into first and second beams, a mirror positioned to direct said first beam through a right angle deflection in a plane normal to the direction of said second beam, a mirror positioned to direct said first beam through a further right angle deflection and parallel to the direction of said second beam, a mirror positioned to direct said second beam through a right angle deflection so that its optical axis lies in a plane defined by the optical axes of said twice deflected first beam and said undeflected second beam, a mirror positioned to deflect said second beam along an axis substantially coinciding with that of said twice-deflected first beam but in a direction opposite thereto, an optical element having back-to-back reflective surfaces, said optical element being positioned with its optical axis substantially in alignment with the coincident axes of said beams for reflecting both beams in return directions, whereby fringe patterns are produced independently of the tilt of said optical element.

6. In an interferometer, comprising a prism having an internal semi-reflective surface for splitting entrant light into first and second beams, a surface for internally reflecting said first beam through a right angle deflection normal to the direction of said second beam, a surface for internally reflecting said first beam through a further right angle deflection and parallel to the initial direction of said second beam, a surface for internally reflecting said second beam through a right angle deflection so that its optical axis lies in a plane including said twice-deflected first beam and said undeflected second beam, a surface for further internally reflecting said second beam along a path having an axis substantially coinciding with that of said twice-deflected first beam but in a direction opposite thereto, an optical element having back-to-back reflective surfaces, said optical element being positioned with its optical axis substantially in alignment with the coincident axis of said beams for reflecting both said beams along their respective paths in return directions, whereby fringe patterns are produced independently of the tilt of said optical element.

References Cited in the file of this patent
UNITED STATES PATENTS

| | | |
|---|---|---|
| 1,625,625 | Ricker | Apr. 19, 1927 |
| 2,732,760 | Rantsch | Jan. 31, 1956 |